United States Patent
Vogt

(10) Patent No.: US 11,110,779 B2
(45) Date of Patent: Sep. 7, 2021

(54) ROLLER BLIND ARRANGEMENT HAVING A GROUNDING ELEMENT

(71) Applicant: Webasto SE, Stockdorf (DE)

(72) Inventor: Steven Vogt, Rochester Hills, MI (US)

(73) Assignee: WEBASTO SE, Stockdorf (DE)

( * ) Notice: Subject to any disclaimer, the term of this patent is extended or adjusted under 35 U.S.C. 154(b) by 175 days.

(21) Appl. No.: 16/360,121

(22) Filed: Mar. 21, 2019

(65) Prior Publication Data

US 2020/0298679 A1 Sep. 24, 2020

(51) Int. Cl.
*B60J 7/00* (2006.01)
*B60J 1/20* (2006.01)

(52) U.S. Cl.
CPC ............ *B60J 7/0015* (2013.01); *B60J 1/2036* (2013.01)

(58) Field of Classification Search
CPC ...... B60J 7/0015; B60J 1/2036; B60J 7/0007; B60R 16/06; E06B 9/50; E06B 9/42; H05F 3/00
USPC .................................. 160/266, 238; 296/214
See application file for complete search history.

(56) References Cited

U.S. PATENT DOCUMENTS

| | | | | |
|---|---|---|---|---|
| 6,161,893 A * | 12/2000 | Ewing | ................... | B60J 7/0015 |
| | | | | 296/152 |
| 9,358,861 B2 * | 6/2016 | Rockelmann | ........... | B60R 5/047 |

FOREIGN PATENT DOCUMENTS

| | | | | |
|---|---|---|---|---|
| DE | 4418561 A1 * | 12/1994 | ............... | B60N 2/58 |
| EP | 0245761 A1 * | 11/1987 | ............... | F02P 7/025 |
| EP | 3236479 A1 * | 10/2017 | ............... | C08K 7/06 |
| KR | 20150010144 | * 1/2015 | ......... | H01L 21/6875 |
| WO | WO-9213594 A1 * | 8/1992 | ............... | A61N 1/16 |

OTHER PUBLICATIONS

Ruskowski, "Seat Cover For Dissipating Electrostatic Charge", Dec. 8, 1994, Clarivate Analytics (Year: 1994).*

* cited by examiner

*Primary Examiner* — Dennis H Pedder
*Assistant Examiner* — Joyce Eileen Hill
(74) *Attorney, Agent, or Firm* — Fitch, Even, Tabin & Flannery, LLP

(57) ABSTRACT

A roller blind arrangement for a motor vehicle having a roller blind web and a winding shaft on which the roller blind web can be wound up to form a roller blind coil and which is mounted on bearing elements on either side of a longitudinal center plane of the roller blind, each bearing element being fixed relative to a vehicle body, wherein at least one of the bearing elements is connected to a metallic component via a grounding element made of electrically conductive polymer, the metallic component being electrically connected to the vehicle body.

10 Claims, 2 Drawing Sheets

ROLLER BLIND ARRANGEMENT HAVING A GROUNDING ELEMENT

FIELD

A roller blind arrangement for a motor vehicle, and in particular a roller blind arrangement having a roller blind web and a winding shaft mounted on bearing elements fixed relative to a vehicle body.

BACKGROUND

Roller blind arrangements are known. The roller blind web of the winding shaft can be wound up on the winding shaft to form a roller blind coil. On both sides, the winding shaft is mounted on respective bearing elements which are fixed relative to the vehicle body and can be made of plastic. To prevent electrostatic charges in the area of the bearing elements and of the roller blind web, grounding elements can be used which connect the bearing elements to a metallic component that is electrically connected to ground. In the art, the grounding element is commonly formed by a wire strand connected to the bearing element via a screw connection and to a guide rail of the roller blind arrangement via another screw connection, the guide rail forming the metallic component that is electrically connected to ground.

SUMMARY

The present embodiments provide a roller blind arrangement having a grounding element that has little own weight and a defined geometry.

According to one approach a roller blind arrangement may have a roller blind web and a winding shaft on which the roller blind web can be wound up to form a roller blind coil and which is mounted on bearing elements on either side of a longitudinal center plane of the roller blind, each bearing element being fixed relative to a vehicle body, wherein at least one of the bearing elements is connected to a metallic component via a grounding element made of electrically conductive polymer, e.g., a plastic polymer or a rubber polymer (which may or may not optionally be a vulcanized rubber polymer allowing it to be capable of deforming elastically), the metallic component being electrically connected to the vehicle body.

Therefore, a roller blind arrangement for a motor vehicle is proposed which may have a roller blind web and a winding shaft on which the roller blind web can be wound up to form a roller blind coil and which is mounted on bearing elements on either side, wherein at least one of the bearing elements is connected to a metallic component via a grounding element made of electrically conductive polymer, the metallic component being electrically connected to the vehicle body.

By using an electrically conductive polymer (e.g., having rubber or plastic) for the grounding element, electrostatic charges on the bearing elements and, where appropriate, on the roller blind coil and/or on fabric tensioning features can be prevented or dissipated on the one hand. With this grounding element, a component having little weight can be used to ground the bearing element in question on the other hand. For example, the grounding element can be at least 20 percent, preferably at least 40 percent, lighter than a comparable element made from a metal composition, e.g., aluminum.

The grounding element is preferably made of rubber, i.e. of an elastic electrostatic dissipating rubber material, and is thus dimensionally stable and elastic at the same time. This allows the grounding element to be flexibly connected to the bearing element in question and to the metallic component in question. Component tolerances can be compensated by such a grounding element, which can also flex with the torsion of the vehicle body. No click and tick noises result.

In a specific embodiment of the roller blind arrangement, the conductive plastic or the conductive rubber may have a styrenic block copolymer (TES/SBC). However, other electrically conductive polymers and plastics can be employed as well, such as conductive thermoplastic elastomers (TPE) including ethylene vinyl acetate (EVA), styrene butadiene rubber (SBR), thermoplastic polyolefin vulcanizates (TPV), thermoplastic polyurethanes (TPU), polyvinylidene fluoride (PVDF) and/or perfluoroalkoxy polymers (PFA).

For being connected to the metallic component, it is advantageous if the grounding element has a fixing tab. Via the fixing tab, the grounding element can be connected to the metallic component using a screw or rivet. It is also conceivable that the grounding element may have an alternative fixing element for connecting it to the metallic component, e.g. a bumper pull tab or the like.

In order to allow the grounding element to be connected to the bearing element of the winding shaft without any additional fixing parts, the grounding element may have a contact tip which enters into a hole of the bearing element. Owing to the inherent spring pre-load of the grounding element, which is in particular made of rubber, the grounding element sits in the hole of the bearing element without play and without rattling.

In order to clearly define the position of the contact tip, which is in particular conical, in the hole of the bearing element, a stop that is in contact with the bearing element can be formed on the contact tip of the grounding element.

In order to require as little installation space as possible between the bearing element in question and the metallic component, the grounding element preferably has a rod-like connecting portion between the contact tip and the fixing tab. The rod-like connecting portion can be bent or curved and can thus be ideally adapted to the respective installation space conditions.

In order to be able to also use the grounding element to ground another component of the roller blind arrangement or another vehicle component, it preferably has a pin, which is connected to a transverse bar of the roller blind arrangement, for example.

The bearing element on which the winding shaft is mounted is preferably formed on a frame element of the roller blind arrangement, in particular on a rear frame part which extends in the transverse direction of the roller blind. This frame element, which is in particular made of plastic or a carbon fiber material, can integrally have the bearing element in question to which the grounding element is connected.

In an advantageous embodiment of the roller blind arrangement according to the invention, the metallic component is a guide rail of the roller blind arrangement, the guide rail being an extruded aluminum profile, for example, and being electrically connected to vehicle ground. If the roller blind arrangement is part of a car sunroof, the metallic component can be a guide rail, or any other appropriate metallic part of the sunroof being electrically connected to the vehicle body.

Other advantages and advantageous embodiments of the subject-matter of the invention are apparent from the description, the drawing, and the claims.

BRIEF DESCRIPTIONS OF THE DRAWINGS

An embodiment of a roller blind arrangement according to the invention is illustrated in the drawing in a schematically simplified manner.

DETAILED DESCRIPTION

Figure 1:
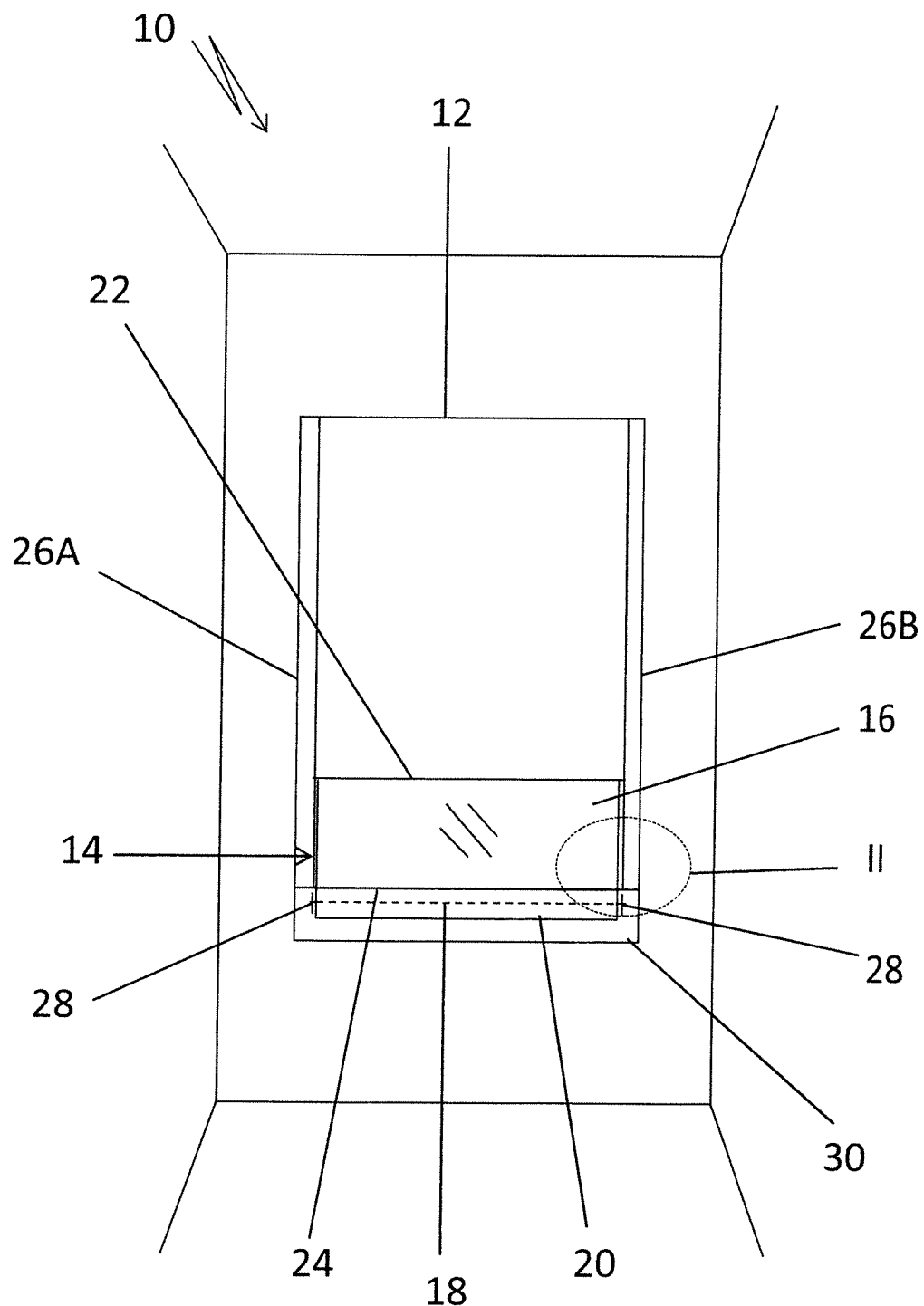
FIG. 1 shows a plan view of a vehicle roof having a roller blind arrangement.
Figure 2:
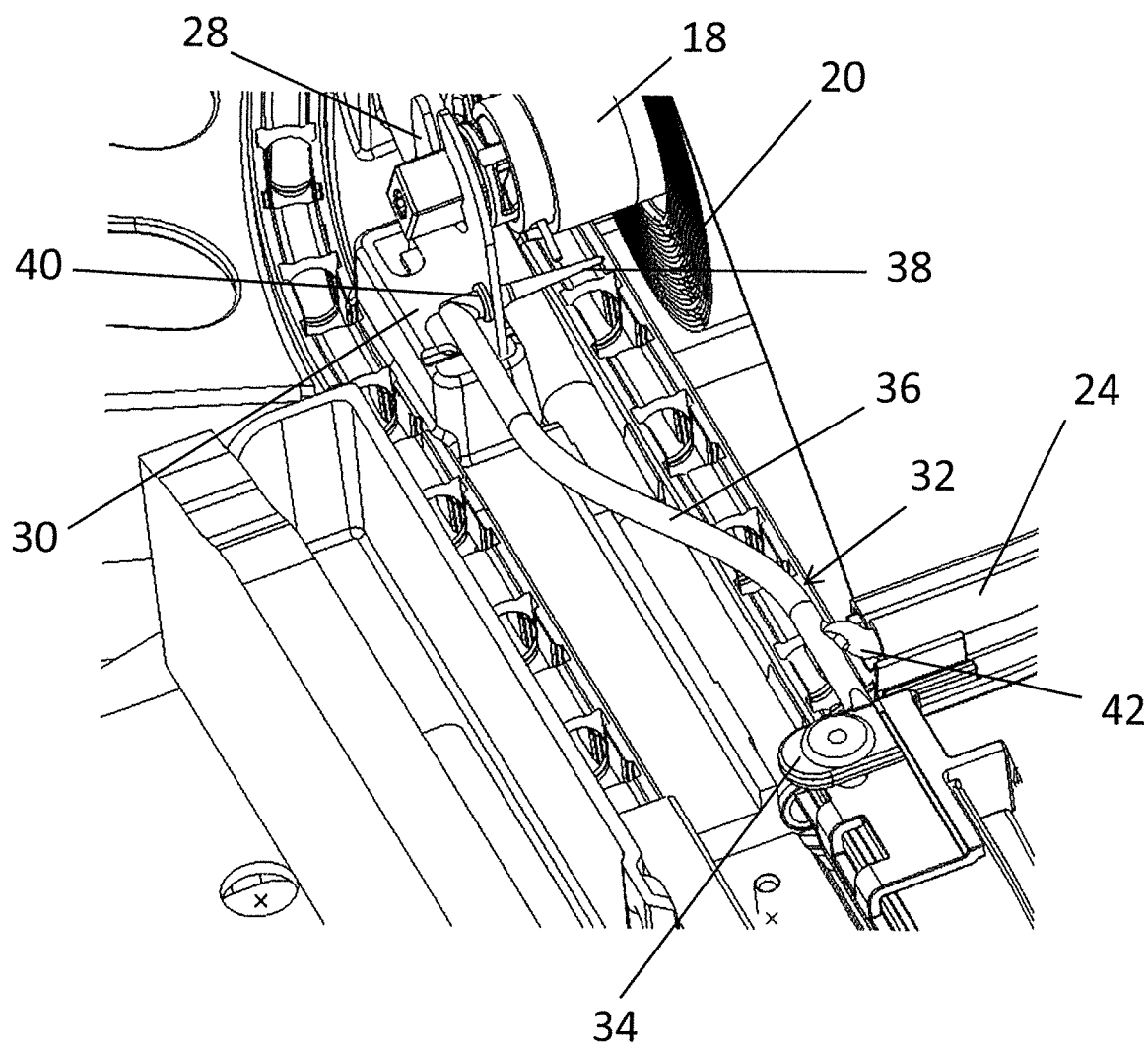
FIG. 2 shows an enlarged perspective view of area II in FIG. 1.
Figure 3:
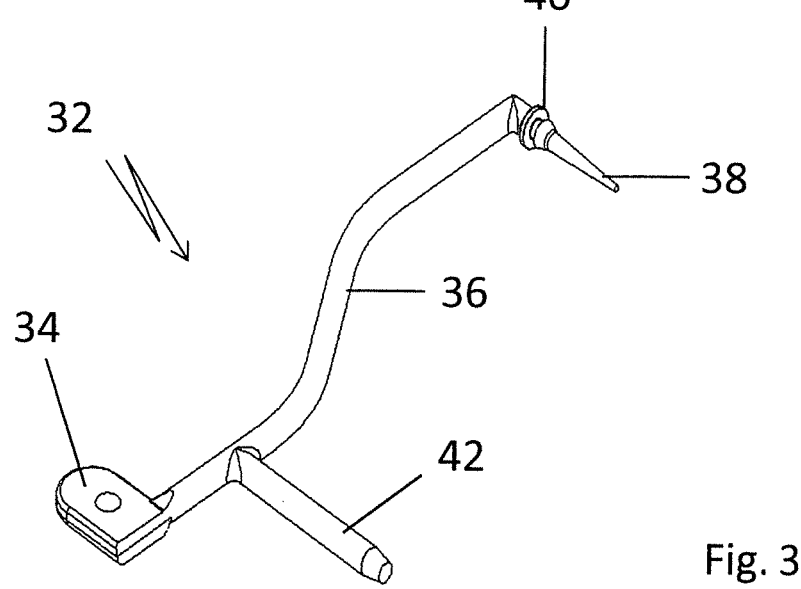
FIG. 3 shows a grounding element of the roller blind arrangement on its own.

The drawings show a vehicle roof 10 which is a roof of a passenger motor vehicle and which has a roof opening 12 that can be closed by means of a lid element (not illustrated) made of glass or opened by choice. In order to protect the vehicle interior against undesired incidence of light through the lid element, vehicle roof 10 has a roller blind arrangement 14 as a shading device.

Roller blind arrangement 14 may have a roller blind web 16 which can be wound up to form a roller blind coil 20 on a winding shaft 18 in the area of a rear edge of roof opening 12. At the edge facing away from roller blind coil 20, roller blind web 16 has a pull bar 22 which extends in the transverse direction of the roof and which serves to displace roller blind web 16 between an open position, in which roof opening 12 is uncovered, and a shading position, in which roof opening 12 is covered. Between winding shaft 18 and roof opening 12, roller blind web 16 runs below a guide bar 24 which, together with pull bar 22, defines a curvature of unwound roller blind web 16 in the transverse direction of the roof. Furthermore, roller blind arrangement 14 has guide rails 26A and 26B on either side of a vertical longitudinal center plane of the roller blind for guiding the ends of pull bar 22 and the side edges of roller blind web 16.

At each of its ends, winding shaft 20 is mounted on a tab-like bearing element 28 which is an integral part of a transverse frame part 30 of roller blind arrangement 14, transverse frame part 30 being an injection-molded plastic part. In particular, the frame part 30 and/or the bearing element 28 can be made of a carbon fiber material that allows some amount of electric conductivity. Alternatively, the bearing element can be made of a metal material which can be overmolded. The rear end faces of guide rails 26A and 26B, which are extruded aluminum profiles, i.e. which are made of an electrically conductive metal material and which are electrically connected to the vehicle body, are adjacent to transverse frame part 30.

In order to prevent electrostatic charges at roller blind web 20, bearing elements 28 and guide bar 24, roller blind arrangement 14 has grounding elements 32 mirror-symmetrical provided on either side of the vertical longitudinal center plane of the roller blind, of which only the grounding element 32 for the area disposed on the right with respect to the forward direction of travel of the vehicle in question is illustrated in the drawings. Grounding element 32, which is formed as a bracket, is a molded part made of an electrically conductive polymer such as a plastic or rubber; in the case at hand, it can be made of a styrenic block copolymer. At its front end, grounding element 32 has a fixing tab 34 via which it is screwed to guide rail 26B. A substantially S-shaped rod-like connecting portion 36 is adjacent to fixing tab 34. At its end facing away from fixing tab 34, connecting portion 36 ends in a conical contact tip 38 which protrudes at a right angle in the direction of the longitudinal center plane of the vehicle and which has an annular collar 40 serving as a stop. Contact tip 38 extends through a hole of bearing element 28, wherein annular collar 40 defines the installation position and is in contact with bearing element 28 under tension.

For discharging electrical charges from guide bar 24, grounding element 32 has a pin 42 which extends into tube-like guide bar 24 and which protrudes from connecting portion 36 in the direction of the vertical longitudinal center plane of the roof. Like fixing tab 34 and contact tip 38, pin 42 is an integral part of grounding element 32.

The invention claimed is:

1. A roller blind arrangement for a motor vehicle, comprising:
    a roller blind web and a winding shaft on which the roller blind web can be wound up to form a roller blind coil and which is mounted on bearing elements on either side of a longitudinal center plane of the roller blind, each bearing element being fixed relative to a vehicle body,
    wherein at least one of the bearing elements is connected to a metallic component via a grounding element made of electrically conductive polymer,
    the metallic component being electrically connected to the vehicle body, and
    wherein the grounding element comprises a contact tip which extends into a hole of the bearing element; and
    wherein the contact tip is conical and protrudes at a right angle in the direction of the longitudinal center plane of the vehicle.

2. The roller blind arrangement according to claim 1, wherein the electrically conductive polymer comprises rubber.

3. The roller blind arrangement according to claim 1, wherein the conductive polymer is a plastic which comprises a styrenic block copolymer.

4. The roller blind arrangement according to claim 1, wherein the grounding element has a fixing tab via which it is attached to the metallic component.

5. The roller blind arrangement according to claim 1, wherein a stop is formed on the contact tip, the stop being in contact with the bearing element.

6. The roller blind arrangement according to claim 1, wherein the grounding element has a rod-like connecting portion between the contact tip and a fixing tab.

7. The roller blind arrangement according to claim 1, wherein the grounding element has a pin which is connected with a transverse bar of the roller blind arrangement.

8. The roller blind arrangement according to claim 1, wherein the bearing element is formed on a frame element of the roller blind arrangement and is made of plastic.

9. The roller blind arrangement according to claim 8, wherein the bearing element is an integral part of the frame element.

10. The roller blind arrangement according to claim 1, wherein the metallic component is a guide rail of the roller blind arrangement.

* * * * *